United States Patent [19]

Müller et al.

[11] Patent Number: 4,656,216

[45] Date of Patent: Apr. 7, 1987

[54] THERMOPLASTICALLY PROCESSABLE POLYVINYL ALCOHOL COMPOSITIONS, PROCESS FOR THEIR PREPARATION, AND FILMS AND MOLDINGS PREPARED FROM THEM

[76] Inventors: Albrecht Müller; Wolfgang Zimmermann, both of Hoechst Aktiengesellschaft, P.O. Box 80 03 20, D-6230 Frankfurt am Main 80, Fed. Rep. of Germany

[21] Appl. No.: 714,045

[22] Filed: Mar. 19, 1985

[30] Foreign Application Priority Data

Mar. 21, 1984 [DE] Fed. Rep. of Germany ....... 3410241

[51] Int. Cl.$^4$ .................. C08L 29/04; C08L 39/00; C08K 5/05; C11D 17/00
[52] U.S. Cl. .................................. 524/381; 524/388; 524/503
[58] Field of Search .................. 524/381, 388, 503

[56] References Cited

U.S. PATENT DOCUMENTS

| | | | |
|---|---|---|---|
| 3,695,989 | 10/1972 | Albert | 428/69 |
| 3,892,905 | 7/1975 | Albert | 524/388 |
| 4,119,604 | 10/1978 | Wysong | 428/220 |
| 4,155,971 | 5/1979 | Wysong | 260/204 |
| 4,156,047 | 5/1979 | Wysong | 428/220 |
| 4,323,492 | 4/1982 | Zimmermann et al. | 524/388 |
| 4,481,326 | 11/1984 | Sonenstein | 524/377 |

FOREIGN PATENT DOCUMENTS

| | | | |
|---|---|---|---|
| 707477 | 3/1965 | Canada | 524/388 |
| 2737339 | 2/1978 | Fed. Rep. of Germany . | |
| 2812684 | 10/1979 | Fed. Rep. of Germany | 524/388 |
| 0034148 | 2/1982 | Japan | 524/388 |
| 937057 | 9/1963 | United Kingdom . | |

*Primary Examiner*—Herbert J. Lilling

[57] ABSTRACT

In order to preserve the solubility of films and moldings of polyvinyl alcohol in cold water even under the action of an aggressive atmosphere, in particular a strongly acidic atmosphere, the thermoplastically processable polyvinyl alcohol composition used for the preparation of the films and moldings is stabilized by the addition of a water-soluble polymer or copolymer which is composed to the extent of at least 70% by weight of monomer units which are carboxylic acid amides at least monosubstituted on the amido nitrogen. N-vinylpyrrolidine, N-vinyl-N-methylacetamide and the alkali metal salts or the ammonium salts of 2-acrylamido-2-methylpropanesulfonic acid have proved to be particularly suitable representatives of this group of compounds.

17 Claims, No Drawings

THERMOPLASTICALLY PROCESSABLE POLYVINYL ALCOHOL COMPOSITIONS, PROCESS FOR THEIR PREPARATION, AND FILMS AND MOLDINGS PREPARED FROM THEM

The invention relates to thermoplastically processable compositions of polyvinyl alcohol, a plasticizer, water and an inhibitor, to a process for the preparation of these compositions and to films and moldings prepared from these compositions, in particular blown films which remain soluble in cold water even after prolonged storage at an elevated temperature and under the action of an aggressive atmosphere.

Polyvinyl alcohol films soluble in cold water are used as packaging for aggressive and toxic substances, which are used as a solution or dispersion in water. Due to packaging in a film soluble in cold water, the handling of such substances, for example plant protection agents or cleansers, is facilitated and rendered safer, because direct contact with the substances during the preparation of solutions or dispersions is avoided. Polyvinyl alcohols which are soluble in water of at most 40° C. are regarded as being soluble in cold water.

A disadvantage of the polyvinyl alcohol packaging films hitherto known is that, under the action of aggressive media, in particular of hydrogen chloride, of bleaches such as sodium chlorite, or cleansers which contain amidosulfonic acid, they are modified on prolonged storage at elevated temperatures to such an extent that they are no longer soluble in cold water. The storage stability of such packages is therefore limited.

Attempts to stabilize thermoplastically processable polyvinyl alcohol compositions by addition of amines failed, since such compositions are modified, even during thermoplastic processing, with pronounced yellowing, to such an extent that solubility in cold water is lost.

An addition of polyacrylamide has the result that the melt viscosity of the polyvinyl alcohol compositions rises to such an extent that thermoplastic processing, in particular into blown films, is no longer possible.

It has now been found that thermoplastically processable polyvinyl alcohol compositions do not have the disadvantages described, if they comprise, per 100 parts by weight of polyvinyl alcohol, 0.5 to 10 parts by weight, preferably 1 to 4 parts by weight, of a water-soluble polymer or copolymer which is composed to the extent of at least 70% by weight of monomer units which are carboxylic acid amides at least monosubstituted on the amido nitrogen.

Examples of the addition according to the invention are homopolymers or copolymers of N-vinylpyrrolidone, of 2-acrylamido-2-methyl-propanesulfonic acid in the form of the alkali metal salt or ammonium salt, and of N-vinyl-N-methyl-acetamide.

In principle, suitable polyvinyl alcohol grades are all the types which are soluble in cold water. To enable them to be processed thermoplastically, plasticizers known per se are added to them. Preferred plasticizers are polyhydric aliphatic alcohols having a boiling point above 250° C., in combination with water. Examples of such alcohols are trimethylolpropane, diglycol (2,2'-dihydroxy-diethyl ether) and glycerol. The quantity depends on the degree of polymerization and on the residual acetyl content of the polyvinyl alcohol. It is larger, the lower the residual acetyl content and the degree of polymerization of the polyvinyl alcohol. As a rule, an addition of 2 to 15 parts by weight of the polyhydric alcohol per 100 parts by weight of polyvinyl alcohol is sufficient.

The required addition of water amounts as a rule to 1 to 5 parts by weight per 100 parts by weight of polyvinyl alcohol.

Larger added quantities of polyhydric aliphatic alcohols of up to 50 parts by weight per 100 parts by weight of polyvinyl alcohol are possible.

For the preparation of a granular product which is modified according to the invention and can readily be handled for hermoplastic processing, a procedure is advantageous in which the polyvinyl alcohol, the particle size of which should expediently be to the extent of at least 70% within the range from 0.4 to 4.0 mm, is first mixed with the polymer which contains carboxylic acid amide, and which preferably is pulverulent and the particle size of which should not be greater than 300 $\mu$m, the water and the alcohol are then added and the mixture, while increasing the temperature to about 60° to 120° C., preferably 60° to 80° C., is mixed thoroughly and intensively, until the mixture again becomes granular after passing through a gelling phase.

The examples which follow illustrate embodiments of the invention.

EXAMPLE 1

The following are introduced into a forced-circulation mixer:

6.0 kg of a granular polyvinyl alcohol having the following characteristic data: viscosity of the 4% aqueous solution 15 mPa.s (measured at 20° C.), ester number 223 mg of KOH/g, particle size distribution: 70% within the range of 0.4 to 4 mm diameter, 60 g of polyvinylpyrrolidone powder having the following characteristic data: molecular weight about 700,000, K value: 90 (cf. handbook "physikalische und technologische Prüfungsverfahren für Lacke und ihre Rohstoffe [physical and technological test methods for surface coatings and their raw materials]" by Wiborn, 1953 edition), and 15 g of stearic acid.

In the course of 1 minute, a solution of 192 g of trimethylolpropane dissolved in 120 g of water is added to this mixture of solids. During this addition, the mixture is stirred at the highest speed of rotation of the stirrer, namely 1,200 min$^{-1}$.

Within 15 minutes, the temperature of the mixture rises to 70° C.; the stirrer speed is then reduced to 600 min$^{-1}$ and the wall of the mixer is cooled with cold water.

At an internal temperature of 65° C., 36 g of a finely dispersed siliconized silica are then added to the mixture. The batch is discharged from the kettle at 60° C.

This gives a free-flowing polyvinyl alcohol composition in the form of non-dusting and non-tacky granules.

EXAMPLE 1(a) (APPLICATION EXAMPLE)

By means of a commercially available single-screw extruder of a length of 25 diameters, the polyvinyl alcohol composition obtained according to Example 1 was processed at a screw speed of 50 min$^{-1}$ in a temperature range between 200° and 170° C. (blow head), a melt pressure of 250 bar at the blow head, a throughput of 75 g×min$^{-1}$ and a take-off speed of 6 m×min$^{-1}$ to give a blown film, in which the blow-up ratio between the blow head diameter and the blown parison was 1:7. This gave a transparent, non-blocking, 30 $\mu$m thick extrusion-blown film which dissolved very rapidly in water of 15° C.

Bags were produced from the polyvinyl alcohol film by welding on a film-welding apparatus; these bags were each filled with 10 g of a dry mixture of finely dispersed silica and 1% concentrated hydrochloric acid, and sealed. To avoid access of air and atmospheric humidity, these bags were packed air-tight in polyethylene and an aluminum foil and stored for 4 weeks at a temperature of 50° C. in a drying cabinet.

After this storage period, the rates of dissolution of the film bags in water of 15° C. were determined. No difference was found between a blank test (a corresponding bag, filled with sorbitol, and stored in the same way) and the bag filled with the material containing hydrogen chloride. Both bags were completely dissolved within 5 minutes, with stirring.

EXAMPLE 2

The following components are introduced into the mixing apparatus described above:

6 kg of a granular polyvinyl alcohol having the following characteristic data: viscosity of the 4% aqueous solution 8 mPa.s (measured at 20° C.), ester number 140 mg of KOH/g, particle size distribution: 70% within a diameter range from 0.4 to 4.0 mm, 60 g of a pulverulent copolymer of the ammonium salt of 2-acrylamido-2-methylpropanesulfonic acid, having a viscosity of 18 mPa.s measured at 1% concentration in water, 150 g of a polyvinyl acetate powder (average degree of polymerization: 1,500; particle diameter 20 to 200 μm), and 15 g of stearic acid.

A solution of 480 g of diglycol and 240 g of glycerol in 240 g of water is added in the course of 1 minute to this solids mixture.

During this addition, the mixture is stirred at 1,200 min$^{-1}$, the highest speed of the stirrer. The temperature of the mixture rises to 60° C. within 15 minutes; the stirrer speed is then reduced to 600 min$^{-1}$ and the mixer wall is cooled with cold water.

36 g of a finely dispersed siliconized silica are then added to the mixture at an internal temperature of 55° C. Subsequently, the batch is discharged from the kettle. This gives a free-flowing, non-dusting and non-tacky granular polyvinyl alcohol composition. There is no deposit on the mixer walls.

EXMPLE 2(a) (Application example)

In accordance with Example 1(a), the polyvinyl alcohol composition obtained in Example 2 is processed in the single-screw extruder to give a perfect 30 μm thick blown film which is free of fish eyes and is non-blocking.

Analogously to Example 1(a), bags are also produced with this film by welding and each filled with 10 g of the finely dispersed silica containing hydrogen chloride and, to avoid access of air and atmospheric humidity, packed air-tight in polyethylene and aluminum foil. For comparison, bags were filled with the chemically inert sorbitol, corresponding to Example 1. After storing the bags for 4 weeks at 50° C. in a drying cabinet, the dissolution rate tests of the bags were then carried out in water of 15° C. Both the bags filled with sorbitol and those with the finely dispersed silica containing hydrogen chloride dissolved without residue within 5 minutes, with stirring.

EXAMPLE 3

The following are introduced into the forced-circulation mixer described above:

6 kg of granular polyvinyl alcohol having the characteristic data described in Example 1, 150 g of a pulverulent copolymer of N-vinyl-N-methylacetamide and 15 g of stearic acid.

A solution of 192 g of trimethylolpropane in 120g of water is added to this mixture, with stirring at 1,200 min$^{-1}$.

Within 10 minutes, the temperature of the mixture rises to 65° C., due to the heat of friction; the stirrer speed is then reduced to 600 min$^{-1}$ and the mixer wall is cooled with cold water.

36 g of a finely dispersed siliconized silica are then added to the mixture at a temperature of 60° C.

The batch is discharged from the kettle at 55° C. This gave a free-flowing, non-dusting and non-blocking granular polyvinyl alcohol composition.

EXAMPLE 3(a) (APPLICATION EXAMPLE)

The composition obtained according to Example 3 is processed into an extrusion-blown film as in Examples 1(a) and 2(a). This gives a non-blocking, clear, 30 μm thick polyvinyl alcohol film.

After the storage test of the film, as described in Examples 1(a) and 2(a), had been carried out with finely dispersed silica containing hydrogen chloride on the one hand and with inert sorbitol on the other hand, the following was found: the bags filled with sorbitol completely dissolved in water of 15° C. within 5 minutes. After this time, the bags filled with fine silica containing hydrogen chloride showed a dissolution residue of 10% by weight.

EXAMPLE 4

The following are introduced into the forced-circulation mixer described above:

6 kg of a granular polyvinyl alcohol having the characteristic data of Example 1, 150 g of a pulverulent copolymeric ammonium salt of 2-acrylamido-2-methylpropanesulfonic acid and 15 g of stearic acid.

At a stirrer speed of 1,200 min$^{-1}$, this material is mixed within 1 minute with a solution of 195 g of trimethylolpropane dissolved in 125 g of water.

Due to the heat of friction, the temperature of the mixture rises to 70° C. within 15 minutes; the stirrer speed is then reduced to 60 min$^{-1}$ and the mixer wall is cooled with cold water.

At a temperature of 65° C., 36 g of a finely dispersed, siliconized silica are then added to the mixture.

The batch is discharged from the kettle at 60° C. This gave a free-flowing, non-dusting and non-tacky, granular polyvinyl alcohol composition.

EXAMPLE 4(a) (APPLICATION EXAMPLE)

As described in the preceding examples, the blend prepared above is also processed into a 30 μm thick extrusion-blown film.

In the storage tests, the following pulverulent substances, in addition to sorbitol as the inert pulverulent material, were also sealed into the bag and stored correspondingly: the finely dispersed silica powder treated with 1% of concentrated hydrochloric acid, amidosulfonic acid and sodium chlorite.

After a storage period of 4 weeks at 50° C., the results of dissolution of the film in water of 15° C. within 5 minutes were as follows:

finely dispersed silica with added hydrogen chloride: complete dissolution amidosulfonic acid: complete dissolution sodium chlorite: residue of 8% of the film.

What is claimed is:

1. A granular polyvinyl alcohol composition which can be processed by thermoplastic means into films and moldings soluble in cold water, and which comprises as essential components (a) a polyvinyl alcohol soluble in cold water, (b) water and a polyhydric aliphatic alcohol having a boiling point above 250° C. as a plasticizer and (c) a water-soluble polymer or copolymer which is composed to the extent of at least 70% by weight of monomer units which are carboxylic acid amides at least monosubstituted on the amido nitrogen.

2. The composition as claimed in claim 1, wherein the content of component (c) is 0.5 to 10 parts by weight per 100 parts by weight of polyvinyl alcohol.

3. The composition as claimed in claim 1, wherein the content of component (c) is 1 to 4 parts by weight per 100 parts by weight of polyvinyl alcohol.

4. A composition as claimed in claim 1, wherein component (c) is a polymer or copolymer of N-vinylpyrrolidone, of the sodium salt or ammonium salt of 2-acrylamido-2-methyl-propanesulfonic acid or of N-vinyl-N-methylacetamide.

5. A process for the preparation of a polyvinyl alcohol composition as claimed in claim 1, which comprises mixing, while dry, a polyvinyl alcohol, soluble in cold water and having an average particle size of at least 70% by weight between 0.4 and 4.0 mm, with the water-soluble polymer or copolymer (c), then adding the water and the alcohol (b) and, while heating the mixture to 60° to 120° C., mixing it thoroughly and intensively, until the mixture again becomes granular after passing through a gelling phase.

6. In preparing a film by thermoplastic deformation from a thermoplastic composition, the improvement wherein the thermoplastic composition is a composition according to claim 1.

7. A polyvinyl alcohol film obtained by thermoplastic deformation and soluble in cold water, which comprises, per 100 parts by weight of polyvinyl alcohol, 0.5 to 10 parts by weight of a water-soluble polymer or copolymer which is composed to the extent of at least 70% by weight of monomer units which are carboxylic acid amides at least monosubstituted on the amido nitrogen.

8. The film as claimed in claim 7, which comprises, per 100 parts by weight of polyvinyl alcohol, 0.5 to 10 parts by weight of a water-soluble polymer or copolymer which is composed to the extent of at least 70% by weight of monomer units of N-vinylpyrrolidone, of the sodium or ammonium salt of 2-acrylamidomethyl-propanesulfonic acid or of N-vinyl-N-methyl-acetamide.

9. A water-containing granular thermoplastically processable polyvinyl alcohol composition which is soluble in cold water and which comprises, per 100 parts by weight of cold-water-soluble polyvinyl alcohol, from 0.5 to 10 parts by weight of a water-soluble polymer comprising at least 70 percent by weight of monomer units which are carboxylic acid amides at least monosubstituted on the amido nitrogen.

10. A composition according to claim 9 having from 1 to 4 parts by weight of the water-soluble polymer.

11. A process of stabilizing a thermoplastically processable cold-water-soluble polyvinyl alcohol composition which comprises incorporating therein, per 100 parts by weight of cold-water-soluble polyvinyl alcohol, from 0.5 to 10 parts by weight of a water-soluble polymer comprising at least 70 percent by weight of monomer units which are carboxylic acid amides at least monosubstituted on the amido nitrogen.

12. A process according to claim 11 wherein the water-soluble polymer is a copolymer of N-vinylpyrrolidone.

13. A process according to claim 11 wherein the water-soluble polymer is a polymer or copolymer of the sodium salt or ammonium salt of 2-acrylamido-2-methyl-propanesulfonic acid.

14. A process according to claim 11 wherein the water-soluble polymer is a polymer or copolymer of N-vinyl-N-methyl-acetamide.

15. A process according to claim 11 wherein the water-soluble polymer is polymer of a N-vinylpyrrolidone having a molecular weight of about 700,000.

16. A composition according to claim 10 wherein the water-soluble polymer is a polymer or copolymer of N-vinyl-pyrrolidone, of the sodium salt or ammonium salt of 2-acrylamido-2-methyl-propanesulfonic acid or of N-vinyl-N-methyl-acetamide.

17. A process according to claim 11 of stabilizing a film prepared from a thermoplastically-processed cold-water-soluble polyvinyl alcohol composition which comprises incorporating in the composition, per 100 parts by weight of cold-water-soluble polyvinyl alcohol, from 0.5 to 10 parts by weight of a water-soluble polymer comprising at least 70% by weight of monomer units which are carboxylic acid amides at least mono substituted on the amido nitrogen.

* * * * *

UNITED STATES PATENT AND TRADEMARK OFFICE
CERTIFICATE OF CORRECTION

PATENT NO. : 4,656,216

DATED : April 7, 1987

INVENTOR(S) : Albrecht Muller, et al

It is certified that error appears in the above-identified patent and that said Letters Patent is hereby corrected as shown below:

On the title page Insert

-- (73) Assignees: Schering Aktiengesellschaft and Hoechst Aktiengesellschaft, each of Fed. Rep. of Germany --.

Signed and Sealed this

Sixteenth Day of February, 1988

Attest:

DONALD J. QUIGG

*Attesting Officer*     *Commissioner of Patents and Trademarks*